(12) United States Patent
Bechtolsheim et al.

(10) Patent No.: US 7,218,632 B1
(45) Date of Patent: May 15, 2007

(54) PACKET PROCESSING ENGINE ARCHITECTURE

(75) Inventors: Andreas V. Bechtolsheim, Stanford, CA (US); David R. Cheriton, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 855 days.

(21) Appl. No.: 09/732,497

(22) Filed: Dec. 6, 2000

(51) Int. Cl.
*H04L 12/28* (2006.01)
(52) U.S. Cl. .................... 370/389; 370/392; 370/419
(58) Field of Classification Search ............... 370/351, 370/360, 389–390, 392, 411, 419, 428; 709/238, 709/242
See application file for complete search history.

(56) References Cited

U.S. PATENT DOCUMENTS

| | | | |
|---|---|---|---|
| 4,491,945 A | 1/1985 | Turner | 370/409 |
| 4,679,189 A | 7/1987 | Olson et al. | 370/399 |
| 4,893,304 A | 1/1990 | Giacopelli et al. | 370/411 |
| 5,088,032 A | 2/1992 | Bosack | 709/242 |
| 5,249,292 A | 9/1993 | Chiappa | 370/392 |
| 5,271,004 A | 12/1993 | Proctor et al. | 370/392 |
| 5,309,437 A | 5/1994 | Perlman et al. | 370/401 |
| 5,440,550 A | 8/1995 | Follett | 370/427 |
| 5,509,006 A | 4/1996 | Wilford et al. | 370/401 |
| 5,519,858 A | 5/1996 | Walton et al. | 709/107 |
| 5,524,254 A | 6/1996 | Morgan et al. | 709/245 |
| 5,566,170 A | 10/1996 | Bakke et al. | |
| 5,598,408 A * | 1/1997 | Nickolls et al. | 370/351 |
| 5,651,002 A | 7/1997 | Van Seters et al. | 370/392 |
| 5,684,797 A | 11/1997 | Aznar et al. | 370/390 |
| 5,684,954 A | 11/1997 | Kaiserswerth et al. | 709/236 |
| 5,774,698 A | 6/1998 | Olnowich | 712/1 |

(Continued)

FOREIGN PATENT DOCUMENTS

WO    WO 94/01828 A1    1/1994

(Continued)

OTHER PUBLICATIONS

Shang-Tsu Chuang et al. "Matching Output Queueing with a Combined Input and Output Queued Switch". Stanford CSL-TR-98-758.

(Continued)

*Primary Examiner*—Doris H. To
*Assistant Examiner*—Saba Tsegaye
(74) *Attorney, Agent, or Firm*—Hickman Palermo Truong & Becker LLP

(57) ABSTRACT

The invention provides a method and system for packet processing, in which a router (or switch) is capable of quickly processing incoming packets, thus performing level 2, 3, and 4 routing and additional services, in real time. A system includes a packet processing engine (PPE), having elements for receiving packets, distinguishing header and payload information for those packets, outsourcing router decision-making to additional hardware resources such as a fast forwarding engine (FFE), and forwarding those packets. The PPE is synchronized to the FFE, so that the PPE can send and the FFE can receive packets at each one of a sequence of constant-duration time quanta. Similarly, the PPE can receive and the FFE can send packet routing information at each one of a sequence of similar time quanta. The PPE and the FFE have separate hardware so that their functions can be performed in parallel without contention for operating resources.

35 Claims, 3 Drawing Sheets

U.S. PATENT DOCUMENTS

| | | | |
|---|---|---|---|
| 5,842,040 A | 11/1998 | Hughes et al. | |
| 5,842,224 A | 11/1998 | Fenner | 711/202 |
| 5,870,382 A | 2/1999 | Tounai et al. | 370/220 |
| 5,909,440 A | 6/1999 | Ferguson et al. | 370/389 |
| 6,094,435 A * | 7/2000 | Hoffman et al. | 370/414 |
| 6,157,641 A | 12/2000 | Wilford | 370/389 |
| 6,212,183 B1 | 4/2001 | Wilford | 370/392 |
| 6,237,054 B1 * | 5/2001 | Freitag, Jr. | 710/72 |
| 6,359,879 B1 * | 3/2002 | Carvey et al. | 370/351 |
| 6,513,108 B1 * | 1/2003 | Kerr et al. | 712/19 |
| 6,636,483 B1 * | 10/2003 | Pannell | 370/236 |
| 6,687,247 B1 * | 2/2004 | Wilford et al. | 370/392 |
| 6,728,249 B2 * | 4/2004 | Chang | 370/395.3 |
| 2001/0012295 A1 | 8/2001 | Wilford | 370/392 |
| 2001/0051864 A1 | 12/2001 | Kerr et al. | 703/27 |
| 2003/0123448 A1 * | 7/2003 | Chang | 370/395.1 |
| 2004/0202184 A1 * | 10/2004 | Yazaki et al. | 370/395.31 |

FOREIGN PATENT DOCUMENTS

WO     WO 96/34479 A1     10/1996

OTHER PUBLICATIONS

Willibald Doeringer et al. "Routing on Longest-Matching Prefixes", IEEE/ACM Transactions on Networking, vol. No.1. Feb. 1996.

Jim Duffy. "Cisco goes with the flow". San Jose, California. May 3, 1996.

Pankaj Gupta et al. "Scheduling Algorithms for an Input-Queued Variable Length Packet Switch". Stanford Univeristy. p. 1-34.

Nick McKeown et al. "Bridges, Routers and Switches". Department of Electrical Engineering. Stanford University, Stanford, CA 94305-9030.

Tong-Bi Pei et al. "VLSI Implementation of Routing Tables: Tries and Cams". Department of Electrical Engineering. Center for Telecommunication Research. Columbia University. 1991 IEEE.

Paul F. Tsuchiya. "A Search Algorithm for Table Entries with Non-contiguous Wildcarting". Bellcore.

\* cited by examiner

PACKET PROCESSING ENGINE ARCHITECTURE

BACKGROUND OF THE INVENTION

1. Field of the Invention

This invention relates to packet processing.

2. Related Art

In a computer network for transmitting information, messages are received by each router (or switch) at an input interface and retransmitted at an output interface, so as to forward those messages onward to their respective destinations. Each router performs a lookup operation for each message it encounters, in which the router determines from the message to which output interface the message should be forwarded.

One problem in the known art is that the lookup operation can be relatively complex, and can use a relatively large amount of processor resources. For example, the lookup operation can be complicated by concurrently determining one or more of the following:

which output interface is the closest, within a defined network topology, to the specified destination;

whether the message is unicast or multicast, and in the latter case, from which input interface the message was received;

whether the message is authorized to be forwarded by this router from its specified source, and whether the message is authorized to be forwarded by this router to its specified destination;

whether the message should be forwarded to a selected output interface for quality of service considerations, security considerations, or other administrative considerations;

whether the message should be counted, measured, or otherwise accounted for, concurrently with forwarding.

Known responses to this problem include (1) to provide greater processing capability, so as to make up for the processor load on the router, (2) to provide only some of these concurrent services, or to provide them only a reduced functionality. While these responses achieve the goal of routing messages in a forwarding network, they have the disadvantage that added services introduce additional load on the router processor and slow down the router.

Accordingly, it would be advantageous to provide a method and system for packet processing that is not subject to drawbacks of the known art.

SUMMARY OF THE INVENTION

The invention provides a method and system for packet processing, in which a router (or switch) is capable of processing incoming packets very quickly, thus performing level 2, 3, and 4 routing and switching, and substantial additional services, in real time. A system includes a packet processing engine (PPE), having elements for receiving packets, distinguishing header and payload information for those packets, outsourcing router decision-making to additional hardware resources (herein a "fast forwarding engine," or FFE), and ultimately forwarding those packets in response to out-sourced decisions.

In a first aspect of the invention, the PPE is time-synchronized to the FFE, so that the PPE can send and the FFE can receive packet routing information for decision-making at each one of a sequence of constant-duration time quanta. Similarly, the PPE can receive and the FFE can send packet routing information at each one of a sequence of similar time quanta. In addition to information about where to forward a packet, packet routing information possibly also includes additional information such as packet treatment in response to access control, class of service or quality of service, accounting, and other administrative or managerial criteria.

In a second aspect of the invention, the PPE and the FFE each have separate hardware resources allocated to their functions; these separate hardware resources can include pin count, on chip memory, and transfer bandwidth to off-chip memory. This allows the PPE and the FFE to each perform their functions in parallel without substantial contention for operating resources.

In a third aspect of the invention, multiple PPE and FFE pairs can be incorporated into a scaleable parallel system, operating in parallel to route (or switch) packets among a plurality of input and output interfaces.

In a preferred embodiment, the PPE includes separate treatment of packet header information and payload information, so the amount of information exchanged between the PPE and the FFE, and the amount of actual data movement performed by the PPE, can be relatively minimized. When determining the packet header information, the PPE can also parse the data packet (particularly what is conventionally called the packet header) and extract fields needed by the FFE to perform it's forwarding, ACL and QoS decisions. In this way, the PPE reduces the amount of data that it needs to transmit to the FFE, thereby reducing the number of pins required by both the PPE and the FFE to implement this communication.

DETAILED DESCRIPTION OF THE PREFERRED EMBODIMENT

In the following description, a preferred embodiment of the invention is described with regard to preferred process steps and data structures. Those skilled in the art would recognize after perusal of this application that embodiments of the invention can be implemented using circuits adapted to particular process steps and data structures described herein, and that implementation of the process steps and data structures described herein would not require undue experimentation or further invention.

System Elements

Figure 1:
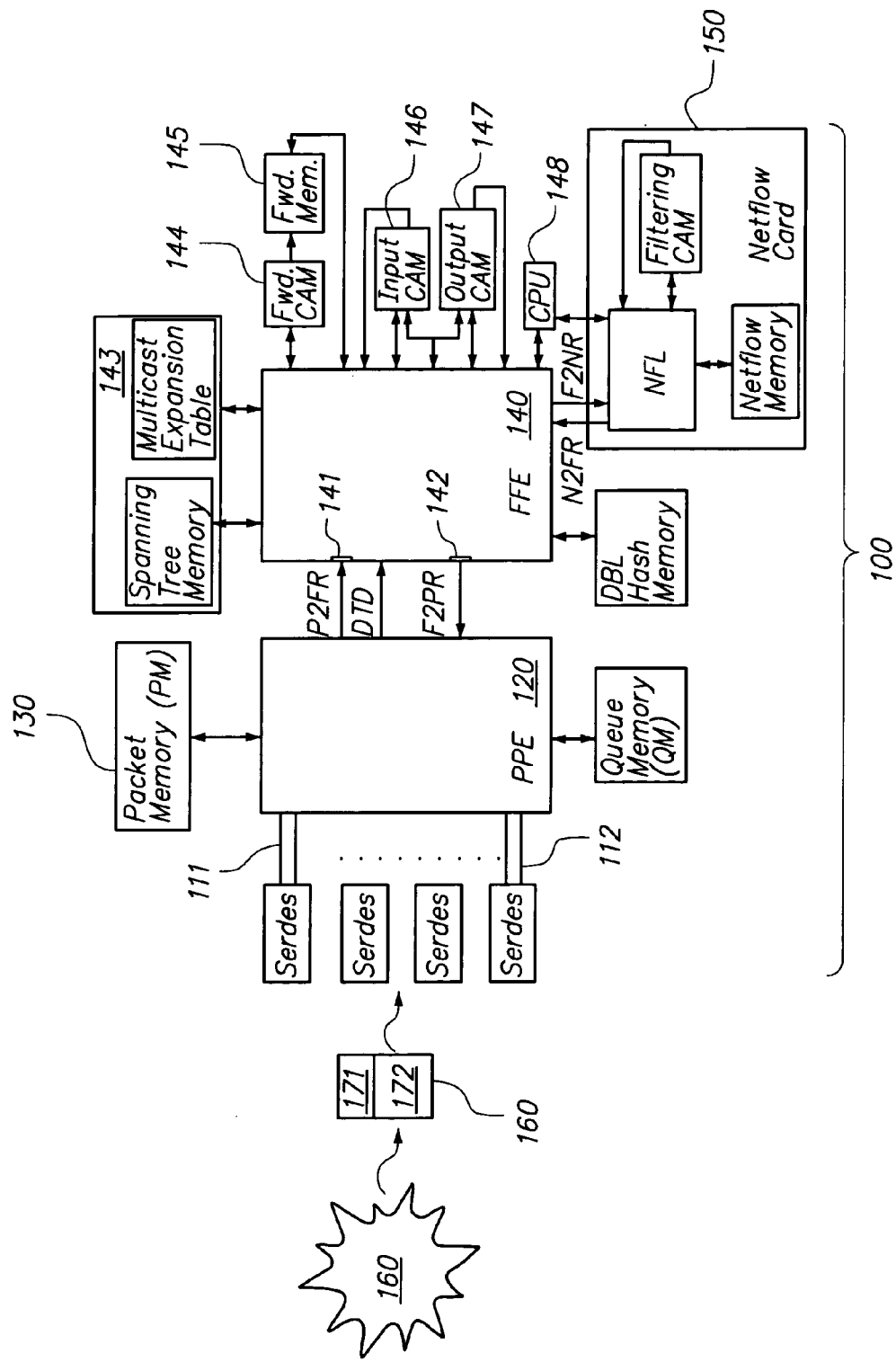
FIG. 1 shows a block diagram of a system for packet processing and packet forwarding.

FIG. 1 shows a block diagram of a system for packet processing and packet forwarding.

A router 100 includes a set of input interfaces 111, a set of output interfaces 112, a packet processing engine (PPE) 120, a PPE memory 130, and a fast forwarding engine (FFE) 140. The router 100 is coupled to one or more communication networks 160. In one embodiment, PPE 120 comprises a single monolithic semiconductor circuit. In one embodiment, FFE 140 comprises single monolithic semiconductor circuit. In one embodiment, PPE, 120 and FFE 140 are together integrated in a single monolithic semiconductor circuit.

The router 100 is disposed for routing (or switching) a sequence of packets 170. Each packet 170 includes packet header information 171 and packet payload information 172. Each packet 170 ultimately has packet forwarding information 173 (not shown) decided for it, which is used for routing the packet 170. Each packet 170 might also have a packet index 174 (not shown) for reference purposes.

Packet Processing Engine

The PPE 120 is disposed to perform the following operations:

The PPE 120 receives input packets 170 at the input interfaces 111.

The input interfaces 111 are coupled to at least one communication network 160.

The PPE 120 distinguishes packet header information 171 from packet payload information 172.

In a preferred embodiment, input packets 170 and output packets 170 are modified using known packet modification protocols, for which there are known parsing rules. The PPE 120 uses these known parsing rules to distinguish packet header information 171 from packet payload information 172. The PPE 120 extracts the packet header information and then stores that packet in the PPE memory 130.

The PPE 120 records packet header information 171 and packet payload information 172 in the PPE memory 130.

In a preferred embodiment, the PPE 120 uses memory access bandwidth to reference the PPE memory 130 for recording and retrieving packet header information 171 and packet payload information 172 using the PPE memory 130. This allows the PPE 120 to refer to packets by a packet index 174.

The PPE 120 forwards packet header information 171 to the FFE 140.

In a preferred embodiment, the PPE 120 is ready to forward packet header information 171 to the FFE 140 each two clock cycles. Each clock cycle is preferably 6–7 nanoseconds. It may occur, for any individual incoming packet 170, that the PPE 120 takes much longer than two clock cycles to distinguish packet header information 171 and packet payload information 172. However, the PPE 120 should have at least one new set of packet header information 171 for the FFE 140 at least that often.

Similarly, in a preferred embodiment, the FFE 140 is ready to receive packet header information 171 from PPE 120 each two clock cycles. It may occur, for any individual incoming packet 170, that the FFE 140 takes much longer than two clock cycles to decide associated packet forwarding information 173. However, the FFE 140 should be ready to receive one new set of packet header information 171 from PPE 120 at least that often.

The PPE 120 receives packet forwarding information 173 for associated packet header information 171 from the FFE 140.

In a preferred embodiment, the PPE 120 uses the packet index 174 to reference both packet header information 171 and associated packet payload information 172 in the PPE memory 130.

The PPE 120 modifies the packet to generate an output packet 170.

In a preferred embodiment, the PPE 120 performs a rewrite operation on the packet 170. Rewrite operations include adjusting a TTL (time-to-live) IP field, determining a new CRC, rewriting the MAC-level addresses, and possibly other modifications of the fields. Rewrite operations, and rewrite rules, are known in the art of Internet packet forwarding.

The PPE 120 sends output packets 170 from the output interfaces 112.

Similar to the input interfaces 111, the output interfaces 112 are also coupled to at least one communication network 160, preferably the same communication network 160 as the input interfaces 111.

Fast Forwarding Engine

The FFE 140 includes a packet information input port 141, a packet forwarding information output port 142, and is coupled to assistance devices for assisting in making packet forwarding decisions.

The FFE 140 is coupled to a set of routing information memories 143 (including a spanning tree memory and a multicast expansion table), a forwarding content addressable memory (CAM) 144 and a forwarding memory 145, an input access CAM 146 and an output access CAM 147, a CPU 148, and a net-flow routing engine 150.

The FFE 140 is disposed to perform the following operations:

The FFE 140 receives packet header information 171.

The FFE 140, with the assistance of the assistance devices, determines packet forwarding information 173 in response to packet header information 171.

In a preferred embodiment, the FFE 140 forwards the packet header information 171 to the forwarding CAM 144, which performs a lookup in its CAM entries to determine packet forwarding information 173 associated with the packet header information 171. Indices responsive to the lookup by the forwarding CAM 144 are recorded in the forwarding memory 145.

The FFE 140 accesses the forwarding CAM 144 to record new forwarding information rules as they become available, such as changes to the perceived network topology, access control, and other administrative or managerial rules. The FFE 140 accesses the forwarding memory 145 to retrieve the packet forwarding information 173 as it is determined.

In a preferred embodiment, the forwarding CAM 144 includes a set of ternary CAM entries. Each ternary CAM entry includes a set of bits which can match to logical 0, to logical 1, or to either (that is, a "don't care" bit). Each ternary CAM entry is thus capable of being matched against the packet header information 171 to determine an index in the forwarding memory 145 of a set of packet forwarding information 173.

In a preferred embodiment, this additional information is responsive to the IP source address, IP source port, IP destination address, IP destination port, protocol type for the packet 170, and whether the packet 170 is unicast or multicast.

In a preferred embodiment, the FFE 140 forwards an identifier for the input interface 111 at which the packet 170 was received to the input access CAM 146, to determine if access is permitted for the packet 170 at that input interface 111.

Similarly, after determining an output interface for the packet 170, the FFE 140 forwards an identifier for the output interface 112 to which the packet 170 is to be sent to the output access CAM 147, to determine if access is permitted for the packet 170 at that output interface 112.

In a preferred embodiment, the packet forwarding information 173 includes how to forward the packet 170 (that is, to which output interface), as well as some or all of the following additional information:

(1) what access control rules (that is, what ACL) to apply to the packet 170;
(2) what class of service (CoS) and quality of service (QoS) rules to apply to the packet 170;
(3) what accounting and statistics to keep regarding the packet 170 or the net flow that the packet 170 is part of;

(4) what other administrative or managerial rules or restrictions to apply to the packet 170.

In a preferred embodiment, this additional information (and other additional services with regard to the packet 170) can be introduced without substantially adding to processing load on the FFE 140, as the forwarding CAM 144 and the forwarding memory 145 provide pattern matching against the packet header information 171.

The network flow routing engine 150 provides network flow packet forwarding information 173 to the FFE 140, if that network flow packet forwarding information 173 is available.

In a preferred embodiment, if the packet 170 can be routed using network flow information, the network-flow routing engine 150 independently determines net-workflow packet forwarding information 173 in response to the network flow associated with the packet header information 171. If the network-flow routing engine 150 is able to determine that network flow packet forwarding information 173, the FFE 140 uses the network flow packet forwarding information 173 in place of packet forwarding information 173 it might otherwise determine for itself.

Method of Operation

Figure 2:
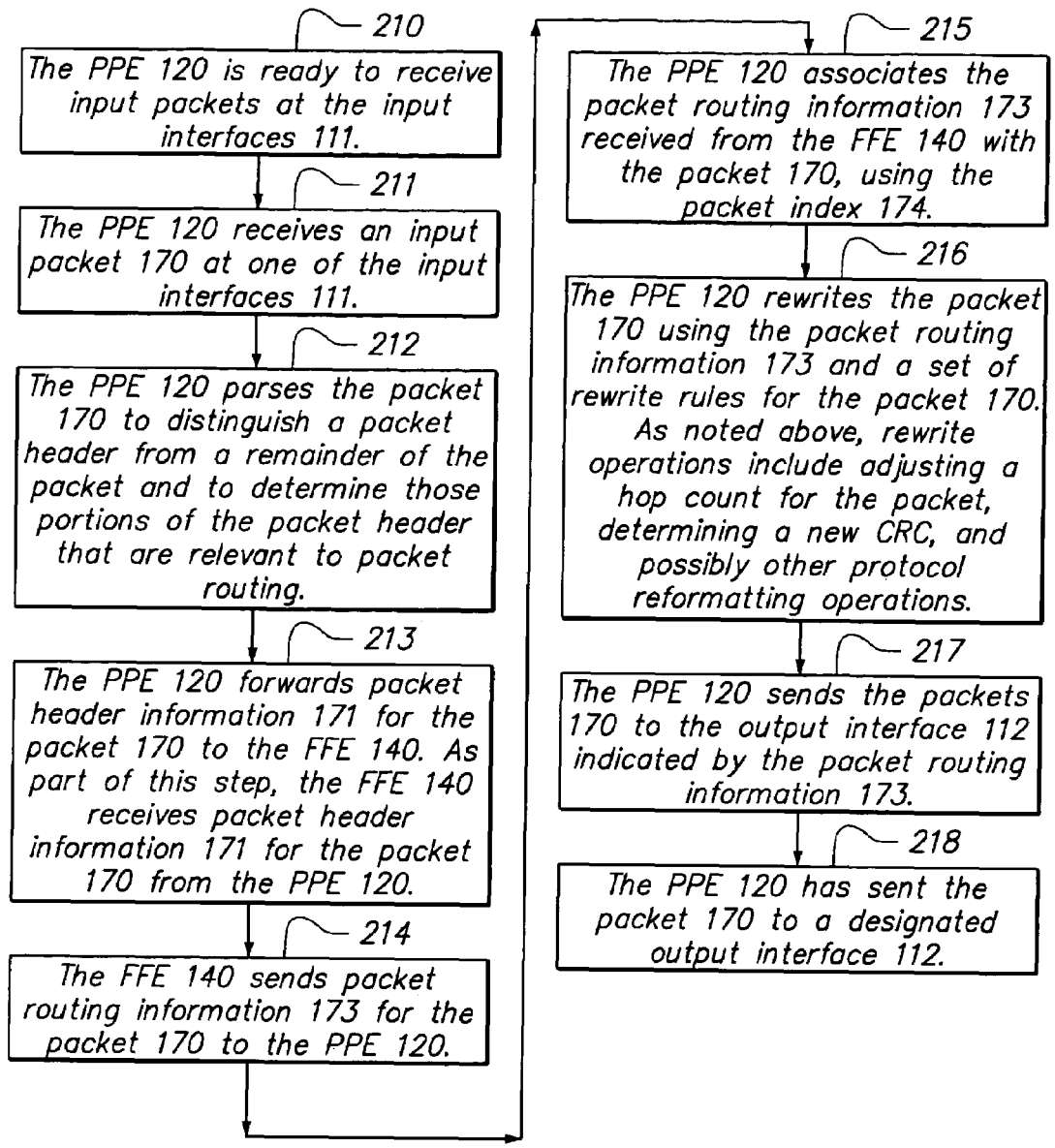
FIG. 2 shows a process flow diagram of a method of using a packet processing element as in FIG. 1.

FIG. 2 shows a block diagram of a packet processing element in a system as in FIG. 1.

A method 200 includes a set of flow points and a set of steps. The system 100 performs the method 200. Although the method 200 is described serially, the steps of the method 200 can be performed by separate elements in conjunction or in parallel, whether asynchronously, in a pipelined manner, or otherwise. There is no particular requirement that the method 200 be performed in the same order in which this description lists the steps, except where so indicated.

At a flow point 210, the PPE 120 is ready to receive input packets 170 at the input interfaces 111.

At a step 211, the PPE 120 receives an input packet 170 at one of the input interfaces 111.

At a step 212, the PPE 120 parses the packet 170 to distinguish a packet header from a remainder of the packet, and to determine those portions of the packet header that are relevant to packet routing. This allows the PPE 120 to distinguish packet header information 171 from packet payload information 172. The packet 170 is not affected by this parsing. The entire packet 170 remains stored in the PPE memory 130 as one unit.

For example, in a preferred embodiment, the PPE 120 determines the IP source address, IP source port, IP destination address, IP destination port, protocol type for the packet 170, and whether the packet 170 is unicast or multicast. In a preferred embodiment, these values are treated as packet header information 171.

At a step 213, the PPE 120 forwards packet header information 171 for the packet 170 to the FFE 140. As part of this step, the FFE 140 receives packet header information 171 for the packet 170 from the PPE 120.

At a step 214, the FFE 140 sends packet forwarding information 173 for the packet 170 to the PPE 120. As part of this step, the PPE 120 receives packet forwarding information 173 for the packet 170 from the FFE 140.

At a step 215, the PPE 120 associates the packet forwarding information 173 received from the FFE 140 with the packet 170, using the packet index 174.

At a step 216, the PPE 120 rewrites the packet 170 using the packet forwarding information 173 and a set of rewrite rules for the packet 170. As noted above, rewrite operations include adjusting a hop count for the packet, determining a new CRC, and possibly other protocol reformatting operations.

At a step 217, the PPE 120 sends the packets 170 to the output interface 112 indicated by the packet forwarding information 173.

After a flow point 218, the PPE 120 has sent the packet 170 to a designated output interface 112.

Parallel System

Figure 3:
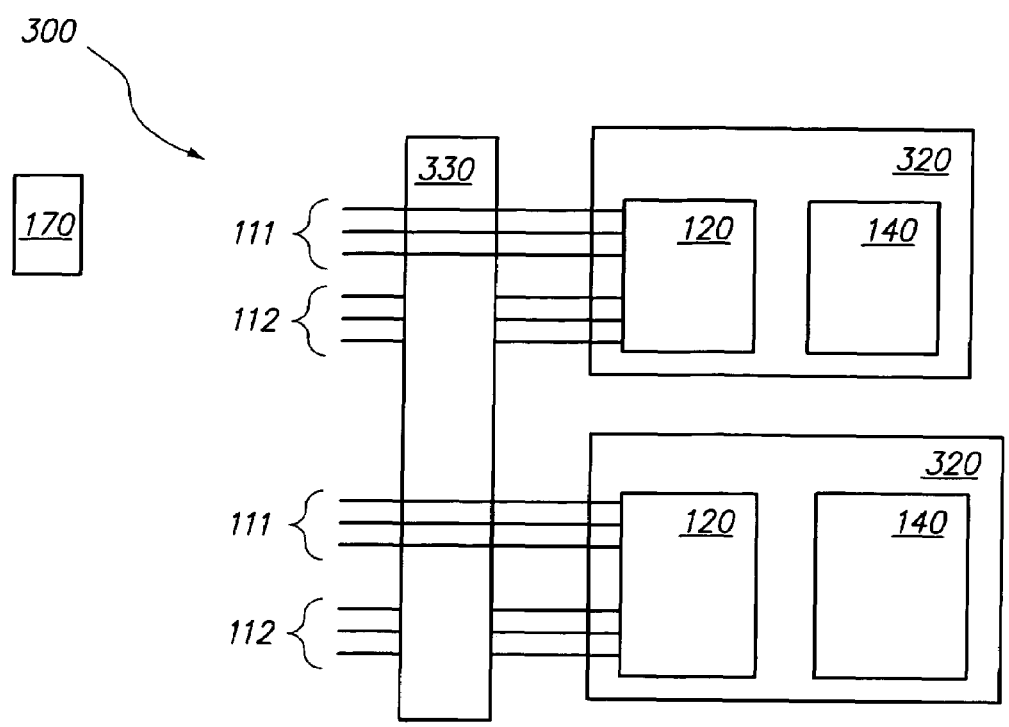
FIG. 3 shows a block diagram of a system for parallel packet processing and packet forwarding.

FIG. 3 shows a block diagram of a system for parallel packet processing and packet forwarding.

A system 300 for parallel packet processing and packet forwarding includes a plurality of interfaces 110, a plurality of routing pairs 320, and a cross-bar switch 330.

Each plurality of interfaces 110 includes a set of input interfaces 111 and a set of output interfaces 112. Packets 170 can be received at the input interfaces 111 and can be sent using the output interfaces 112.

Each routing pair 320 includes a matched PPE 120 and FFE 140, and associated memories and assistance devices, as described with reference to FIG. 1.

The cross-bar switch 330 is coupled to outputs from each PPE 120 in each matched routing pair 320.

When a packet 170 is received at a particular interface 110 (and thus at a particular input interface 111 therein), they are coupled to the routing pair 320 associated with that particular interface 110.

When a packet 170 is received at a particular routing pair 320, it is received by the PPE 120 in that particular matched routing pair 320. The PPE 120 and the FFE 140 in that particular routing pair 320 cooperate to route (or switch) and otherwise process the packet 170 as described with regard to FIG. 1 and FIG. 2.

When a packet 170 is output from a routing pair 320, the PPE 120 forwards the packet 170 to the crossbar switch 330 with instructions indicating a particular destination interface 110. The crossbar switch 330 provides flow control between different routing pairs 320 so that multiple routing pairs 320 do not simultaneously send packets 170 to the same output interface 112 and overrun buffering therein.

When a packet 170 arrives at the cross-bar switch 330, the cross-bar switch 330 forwards that packet 170 to its destination interface 110, at which it is output from its destination output interface 112.

ALTERNATIVE EMBODIMENTS

Although preferred embodiments are disclosed herein, many variations are possible which remain within the concept, scope, and spirit of the invention, and these variations would become clear to those skilled in the art after perusal of this application.

The invention claimed is:

1. Apparatus including a first device having a plurality of network input interfaces and a plurality of network output interfaces, said first device including a packet information extractor coupled to at least one of said network input interface, said first device comprising logic for extracting packet information without performing packet forwarding decisions;

a second device coupled to said packet information extractor, said second device comprising logic configured for generating packet forwarding information and output port information responsive to an output of said packet information extractor, wherein said second device performs generating packet forwarding information substantially for first packets substantially in parallel with said first device performing extracting packet information for other packets, wherein the second device accesses a forwarding memory to record one or more forwarding information rules as the forwarding information rules become available to the second device in response to changes in any one of network topology, access control, and administrative and managerial rules;

an information link, coupled to said first device and said second device;

a network flow routing engine coupled to said second device, wherein the network flow routing engine determines network flow packet forwarding information in response to receiving network flow information associated with said output of said packet information extractor and provides said network flow packet forwarding information to said second device, wherein said second device uses said network flow packet forwarding information in generating said packet forwarding information;

an input access content addressable memory coupled to said second device and operable to determine whether access is permitted at any one of said plurality of network input interfaces; and an output access content addressable memory coupled to said second device and operable to determine whether access is permitted at any one of said plurality of network output interfaces.

2. Apparatus as in claim 1, wherein said first device includes a packet rewriter coupled to at least one said net-work output interface; and said second device includes a packet rewrite generator coupled to said first device, said packet rewrite generator disposed for generating said packet forwarding information and output port information;

wherein said packet rewrite element is responsive to said packet rewrite generator.

3. Apparatus as in claim 1, including a packet buffer memory coupled to said first device.

4. Apparatus as in claim 1, wherein said first device comprises a single monolithic semiconductor circuit.

5. Apparatus as in claim 1, wherein said second device comprises a single monolithic semiconductor circuit.

6. Apparatus as in claim 1, wherein a single monolithic semiconductor circuit comprises said first device and said second device.

7. Apparatus as in claim 1, including a rewrite table including said rewrite information.

8. Apparatus as in claim 7, wherein said first device includes said rewrite table.

9. Apparatus as in claim 7, wherein said second device includes an address pointing into said rewrite table, wherein said address can be forwarded to said first device.

10. Apparatus including
a first device having at least one input interface and at least one output interface, said first device including an information extractor having an input coupled to a packet received from said input interface and having an output coupled to a first memory, said first device comprising logic for extracting packet information without performing packet forwarding decisions; and
a second device including a decision generator having an input coupled to said first device, and having an output coupled to said first device, wherein said second device performs generating packet forwarding information substantially for first packets substantially in parallel with said first device performing extracting packet information for other packets, wherein the second device accesses a forwarding memory to record one or more forwarding information rules as the forwarding information rules become available to the second device in response to changes in any one of network topology, access control, and administrative and managerial rules;

wherein said first device is responsive to a forwarding treatment from said second device to determine a set of said output interfaces on which to couple said packet;

a network flow routing engine coupled to said second device, wherein the network flow routing engine determines network flow packet forwarding information in response to receiving network flow information associated with said packet information extracted by said information extractor and provides said network flow packet forwarding information to said second device, wherein said second device uses said network flow packet forwarding information in generating said packet forwarding information;

an input access content addressable memory coupled to said second device and operable to determine whether access is permitted at said at least one input interface; and an output access content addressable memory coupled to said second device and operable to determine whether access is permitted at said at least one output interface.

11. Apparatus as in claim 10, wherein said forwarding treatment includes packet rewrite information; and said first device is responsive to said packet rewrite information to rewrite said packet before coupling said packet to said set of output interfaces.

12. Apparatus as in claim 10, wherein said forwarding treatment includes at least one action relating to accounting.

13. Apparatus as in claim 10, wherein said forwarding treatment is responsive to information regarding access control.

14. Apparatus as in claim 10, wherein said forwarding treatment is responsive to information regarding class of service or quality of service.

15. Apparatus as in claim 10, wherein said forwarding treatment is responsive to information regarding parsing, extracting and encoding the packet information passed from said first device to said second device so as to minimize the amount of said information forwarded between said first device and said second device.

16. Apparatus as in claim 10, wherein said forwarding treatment is responsive to said packet information memory.

17. Apparatus as in claim 10, wherein said first device comprises a single monolithic semiconductor circuit.

18. Apparatus as in claim 10, wherein said second device comprises a single monolithic semiconductor circuit.

19. A method for packet processing comprising computer-implemented steps of:
at a Packet Processing Engine, receiving a plurality of input packets at one or more input interfaces, distinguishing first packet header information from a first input packet, and forwarding said first packet header information to a Fast Forwarding Engine;
at the Fast Forwarding Engine, determining packet forwarding information, and sending said packet forwarding information to the Packet Processing Engine;
a network flow routing engine coupled to said Fast Forwarding Engine, wherein the network flow routing engine determines network flow packet forwarding information in response to receiving network flow information associated with said first packet header information and provides said network flow packet forwarding information to said Fast Forwarding Engine, wherein said Fast Forwarding Engine uses said network flow packet forwarding information in generating said packet forwarding information;

generating, at said Packet Processing Engine, an output packet based on said packet forwarding information and said first packet; and sending said output packet from a first output interface among one or more output interfaces of the Packet Processing Engine, wherein the Fast Forwarding Engine is coupled to and accesses a forwarding memory to record one or more forwarding information rules as the forwarding information rules become available to the Fast Forwarding Engine in response to changes in any one of network topology, access control, and administrative and managerial rules, and wherein said Fast Forwarding Engine is coupled to an input access Content Addressable Memory and an output access Content Addressable Memory.

20. A method as recited in claim 19, wherein the steps performed by the Packet Processing Engine and the steps performed by the Fast Forwarding Engine are performed in parallel.

21. A method as recited in claim 19, wherein said one or more input interfaces are coupled to at least one communication network.

22. A method as recited in claim 19, wherein the step of distinguishing first packet header information from a first input packet is performed by parsing said first packet.

23. A method as recited in claim 19, wherein the packets are stored and accessed by a packet index.

24. A method as recited in claim 19, wherein the first packet header includes an IP source address, IP source port, IP destination address, IP destination port, protocol type, and information indicating whether the packet is unicast or multicast.

25. A method as recited in claim 19, wherein the step of generating an output packet based on said packet forwarding information includes a rewrite operation.

26. A method as recited in claim 25, wherein the rewrite operation includes adjusting hop count for the packet, determining a new CRC and performing packet reformatting operations.

27. A method as recited in claim 19, wherein said Fast Forwarding Engine is coupled to assistance devices for assisting in making packet forwarding decisions.

28. A method as recited in claim 19, wherein said Fast Forwarding Engine is coupled to a set of routing information memories.

29. A method as recited in claim 19, wherein said Fast Forwarding Engine is coupled to a forwarding content addressable memory.

30. A method as recited in claim 29, wherein the Fast Forwarding Engine sends the packet header information to the forwarding content addressable memory.

31. A method as recited in claim 30, wherein the forwarding Content Addressable Memory determines packet forwarding information based on the packet header information.

32. A method as recited in claim 29, wherein the Fast Forwarding Engine accesses the forwarding Content Addressable Memory to retrieve the packet forwarding information.

33. A method as recited in claim 19, wherein the Fast Forwarding Engine forwards an identifier of a first input interface, at which said first packet is received, to said input access Content Addressable Memory to determine if access is permitted for said first packet.

34. A method as recited in claim 19, wherein the Fast Forwarding Engine forwards an identifier of said first output interface to said output access Content Addressable Memory to determine if access is permitted for said first packet.

35. A method as recited in claim 19, further comprising the step of storing said first packet in said Packet Processing Engine.

* * * * *